US007832455B1

(12) United States Patent
Johnston et al.

(10) Patent No.: US 7,832,455 B1
(45) Date of Patent: Nov. 16, 2010

(54) VEHICLE WINDOW SECURITY SCREEN SYSTEM

(76) Inventors: Lorne G. Johnston, Box 5731 Station Main, High River (CA) T1V 1P3; Mona A. Bareham, Box 5731 Station Main, High River (CA) T1V 1P3

( * ) Notice: Subject to any disclaimer, the term of this patent is extended or adjusted under 35 U.S.C. 154(b) by 259 days.

(21) Appl. No.: 11/940,945

(22) Filed: Nov. 15, 2007

Related U.S. Application Data (60) Provisional application No. 60/860,692, filed on Nov. 24, 2006.

(51) Int. Cl.
 *A47G 5/00* (2006.01)
(52) U.S. Cl. .................... 160/372; 160/104; 160/DIG. 2
(58) Field of Classification Search ................. 160/372, 160/104, 105, 225, 228, 370.21, 379, 216, 160/DIG. 2
 See application file for complete search history.

(56) References Cited

U.S. PATENT DOCUMENTS

| | | | | |
|---|---|---|---|---|
| 1,159,144 | A | * | 11/1915 | Willhoite ..................... 160/379 |
| 1,260,385 | A | * | 3/1918 | Humphrey .................. 160/221 |
| 1,723,594 | A | * | 8/1929 | Zaisser ........................ 160/105 |
| RE17,911 | E | * | 12/1930 | Rexinger ..................... 160/216 |
| 1,946,381 | A | * | 2/1934 | Bank ........................... 160/105 |
| 2,704,121 | A | * | 3/1955 | Maidhof et al. ............. 160/216 |
| 2,742,961 | A | * | 4/1956 | Van Camp et al. .......... 160/105 |
| 2,803,471 | A | * | 8/1957 | Roth ........................... 280/748 |
| 3,422,876 | A | * | 1/1969 | Fester ......................... 160/40 |
| 3,749,147 | A | | 7/1973 | Hess et al. |
| 3,960,195 | A | | 6/1976 | Marchbanks |
| 4,057,094 | A | | 11/1977 | Smith |
| 4,139,233 | A | | 2/1979 | Bott |
| 4,285,383 | A | | 8/1981 | Steenburgh |
| 4,398,586 | A | | 8/1983 | Hall |
| 4,400,911 | A | | 8/1983 | Bell et al. |
| 4,400,912 | A | | 8/1983 | Wicks, Sr. |
| 4,463,790 | A | | 8/1984 | Clapsaddle |
| 4,478,002 | A | | 10/1984 | English |
| 4,532,734 | A | | 8/1985 | Jokel |
| 4,573,285 | A | | 3/1986 | Jokel |
| 4,577,438 | A | | 3/1986 | Santiago |
| 4,593,492 | A | | 6/1986 | Lumenello |
| 4,653,226 | A | | 3/1987 | Woodrow |
| 4,653,562 | A | * | 3/1987 | Moss et al. .................. 160/105 |
| 4,679,351 | A | | 7/1987 | Zarlengo et al. |
| 4,730,413 | A | | 3/1988 | Henry |
| 4,756,122 | A | | 7/1988 | Snapka |
| 4,799,422 | A | | 1/1989 | Birt |
| 4,835,906 | A | | 6/1989 | Collin |
| 4,848,030 | A | | 7/1989 | Bennett |
| 4,854,364 | A | * | 8/1989 | Junker ........................ 160/105 |
| 4,899,490 | A | | 2/1990 | Jokel |
| 4,913,212 | A | | 4/1990 | Clavier |
| 4,936,368 | A | | 6/1990 | Philbeck et al. |
| 5,007,200 | A | | 4/1991 | Londono |

(Continued)

*Primary Examiner*—Blair M. Johnson
(74) *Attorney, Agent, or Firm*—Neustel Law Offices (57) ABSTRACT

A vehicle window security screen system for providing interior ventilation of a vehicle while maintaining the security of the vehicle. The vehicle window security screen system generally includes a first frame having a first mesh and a second frame having a second mesh adjustably connected to one another. The first frame and the second frame form the shape of a window opening in a vehicle to secure the interior contents of a vehicle while simultaneously providing adequate ventilation.

3 Claims, 8 Drawing Sheets

U.S. PATENT DOCUMENTS

| | | |
|---|---|---|
| D323,481 S | 1/1992 | Freeman |
| 5,141,046 A | 8/1992 | Duncan |
| D337,297 S | 7/1993 | Johnson |
| 5,267,413 A | 12/1993 | Hubert et al. |
| 5,269,096 A | 12/1993 | Hade |
| 5,299,616 A | 4/1994 | Sholtz |
| 5,311,701 A | 5/1994 | Psaros |
| 5,419,605 A | 5/1995 | Puaatuua |
| 5,454,415 A | 10/1995 | Bolling et al. |
| 5,501,041 A | 3/1996 | Fischbeck et al. |
| 5,524,694 A | 6/1996 | Arapis |
| 5,570,542 A | 11/1996 | Cameron |
| 5,570,543 A | 11/1996 | Bishop |
| 5,603,183 A | 2/1997 | Giovinazzi |
| 5,628,355 A | 5/1997 | Gist |
| 5,713,624 A | 2/1998 | Tower |
| 5,768,827 A | 6/1998 | Hackett |
| 5,829,388 A * | 11/1998 | Rosso ..................... 119/416 |
| 5,879,048 A | 3/1999 | Tower |
| 5,992,498 A | 11/1999 | Boston |
| 6,016,861 A | 1/2000 | Davis |
| 6,145,573 A | 11/2000 | Chen |
| 6,167,656 B1 | 1/2001 | Devlin et al. |
| 6,192,628 B1 * | 2/2001 | Pinheiro et al. ................. 49/70 |
| 6,240,996 B1 | 6/2001 | Runions |
| 6,276,426 B1 | 8/2001 | Polak |
| 6,305,124 B1 | 10/2001 | Pennington |
| 6,367,536 B1 | 4/2002 | St Louis |
| 6,405,497 B1 | 6/2002 | Christopolous |
| 6,508,039 B2 | 1/2003 | Gezelin |
| 6,796,358 B1 | 9/2004 | Moore |
| 7,036,869 B1 | 5/2006 | Stipanovich |
| 7,063,374 B1 | 6/2006 | Cameron |
| 7,114,760 B2 | 10/2006 | Cameron |
| 7,137,428 B1 | 11/2006 | Alford |
| 7,150,246 B1 | 12/2006 | Weimer |
| 7,159,360 B2 | 1/2007 | Platts |
| 7,416,013 B2 * | 8/2008 | Murray et al. ............... 160/105 |

* cited by examiner

VEHICLE WINDOW SECURITY SCREEN SYSTEM

CROSS REFERENCE TO RELATED APPLICATIONS

I hereby claim benefit under Title 35, United States Code, Section 119(e) of U.S. provisional patent application Ser. No. 60/860,692 filed Nov. 24, 2006. The 60/860,692 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to vehicle window screens and more specifically it relates to a vehicle window security screen system for providing interior ventilation of a vehicle while maintaining the security of the vehicle.

2. Description of the Related Art

Any discussion of the related art throughout the specification should in no way be considered as an admission that such related art is widely known or forms part of common general knowledge in the field.

Vehicle owners with pets face a serious dilemma when traveling with pets: leave them in the car with the windows up which will increase the temperature of the interior to potentially deadly levels for the pet, remove the pet from the vehicle, or risk the security of their vehicle by opening their windows.

Opening the windows of a vehicle creates a security problem for the user as any unscrupulous individual could gain access through the upper slot created in the door. Another problem is that opening the windows of the vehicle only slightly does not allow for adequate airflow through the vehicle on hot days resulting in an extremely hot temperature within the interior of the vehicle. Various complex devices have been created to increase vehicle ventilation while parked (e.g. solar powered blowers, etc.) but these devices are expensive and difficult to use.

Because of the inherent problems with the related art, there is a need for a new and improved vehicle window security screen system for providing interior ventilation of a vehicle while maintaining the security of the vehicle.

BRIEF SUMMARY OF THE INVENTION

The general purpose of the present invention is to provide a vehicle window security screen system that has many of the advantages of the vehicle window screens mentioned heretofore. The invention generally relates to a vehicle window screen which includes a first frame having a first mesh and a second frame having a second mesh adjustably connected to one another. The first frame and the second frame form the shape of a window opening in a vehicle to secure the interior contents of a vehicle while simultaneously providing adequate ventilation.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide a vehicle window security screen system for providing interior ventilation of a vehicle while maintaining the security of the vehicle.

Another object is to provide a vehicle window security screen system that may be utilized in various types and sizes of vehicles.

An additional object is to provide a vehicle window security screen system that reduces the ability of another to gain unauthorized access to the interior of a vehicle.

A further object is to provide a vehicle window security screen system that decreases solar loading within a vehicle to prevent harm to a pet within the vehicle.

A further object is to provide a vehicle window security screen system that allows pet owners to keep their pets within a vehicle during hot days.

Another object is to provide a vehicle window security screen system that prevents the escape of a pet from a vehicle.

A further object is to provide a vehicle window security screen system that may be utilized within a vehicle window, a building window or a camper window.

A further object is to provide a vehicle window security screen system that is easy and efficient to install.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Turning now descriptively to the drawings, in which similar reference characters denote similar elements throughout the several views, FIGS. 1 through 8 illustrate a vehicle window security screen system 10, which comprises a first frame 20 having a first mesh and a second frame 40 having a second mesh adjustably connected to one another. The first frame 20 and the second frame 40 form the shape of a window opening 16 in a vehicle 12 to secure the interior contents of a vehicle 12 while simultaneously providing adequate ventilation. When the first frame 20 and the second frame 40 are assembled, they form the shape of the window opening 16 they are to be placed in (e.g. door 14 of a vehicle 12, building, camper, etc.). The frames 20, 40 may be constructed of various types of materials (e.g. metal, plastic) and may also be colored to correspond to the structure they are being attached to.

B. First Frame

Figure 3:
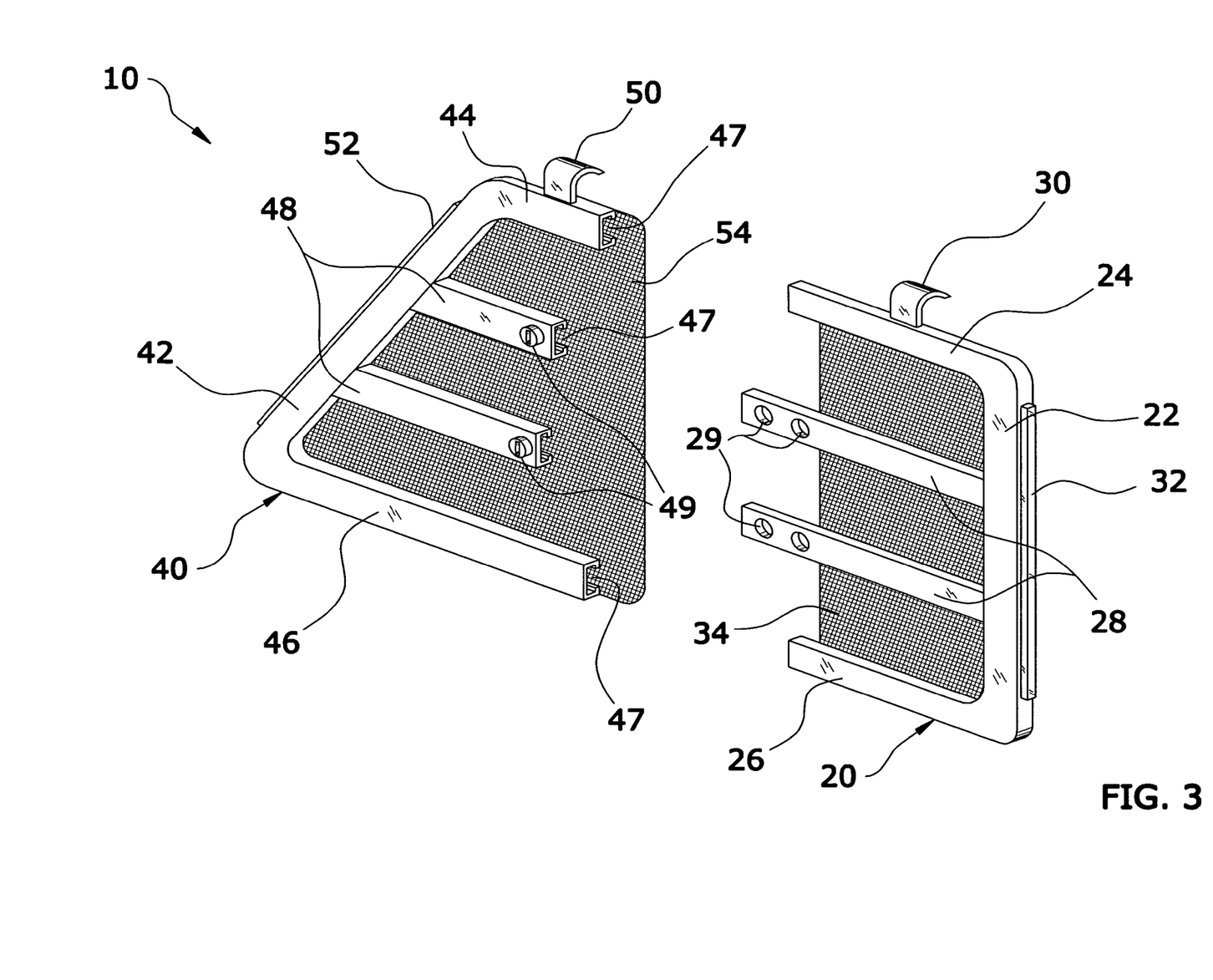
FIG. 3 is a rear exploded upper perspective view of the present invention.

FIG. 3 best illustrates the first frame 20. The first frame 20 includes at least one first extended member 28 which slidably connects with a second extended member 48 from the second frame 40 for adjusting the position of the first frame 20 and the second frame 40 with respect to one another. It is preferable have at least two first extended members 28 for increased security as illustrated in FIG. 3 of the drawings.

The first frame 20 is preferably comprised of a first member 22 extending in a substantially vertical manner as shown in FIG. 3 of the drawings. The first extended members 28 extend substantially horizontally from the first member 22 as best illustrated in FIG. 5 of the drawings.

The first frame 20 further preferably includes a first upper member 24 extending horizontally from an upper end of the first member 22 and a first lower member 26 extending horizontally from a lower end of the first member 22. The first extended member is preferably substantially parallel with respect to the first upper member 24 and the first lower member 26 as further shown in FIG. 5 of the drawings. The first upper member 24, the first member 22 and the first lower member 26 preferably form a U-shaped structure.

The first frame 20 preferably includes a first rib 32 extending along a portion of the first member 22 to fit within a window channel 15 of a door 14 of a vehicle 12 as illustrated in FIGS. 2 through 5 and 8 of the drawings. The first rib 32 has a width sufficient to a snug fit within the channel of the window channel 15.

Figure 4:
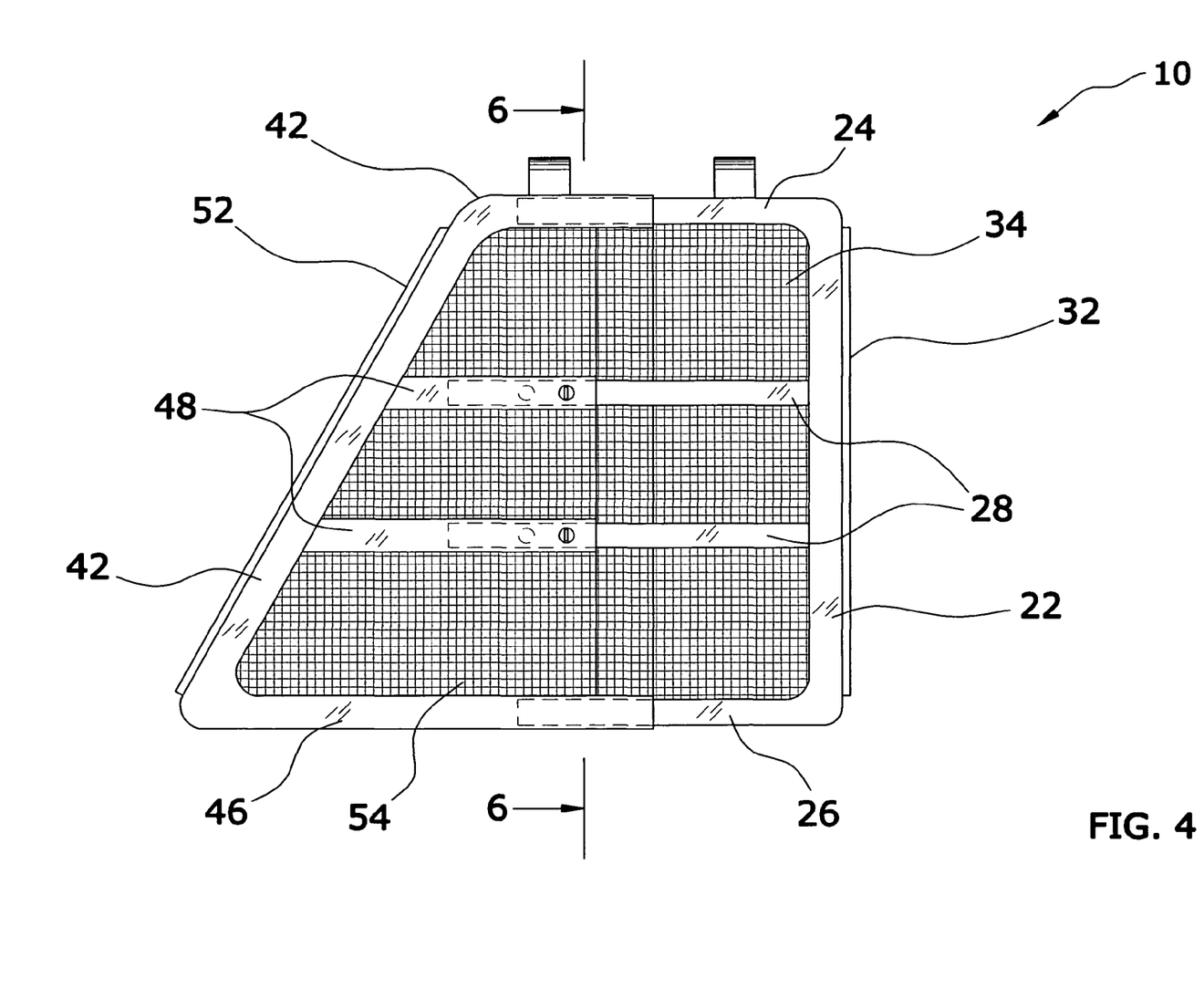
FIG. 4 is an inner side view of the present invention in the retracted position.
Figure 5:
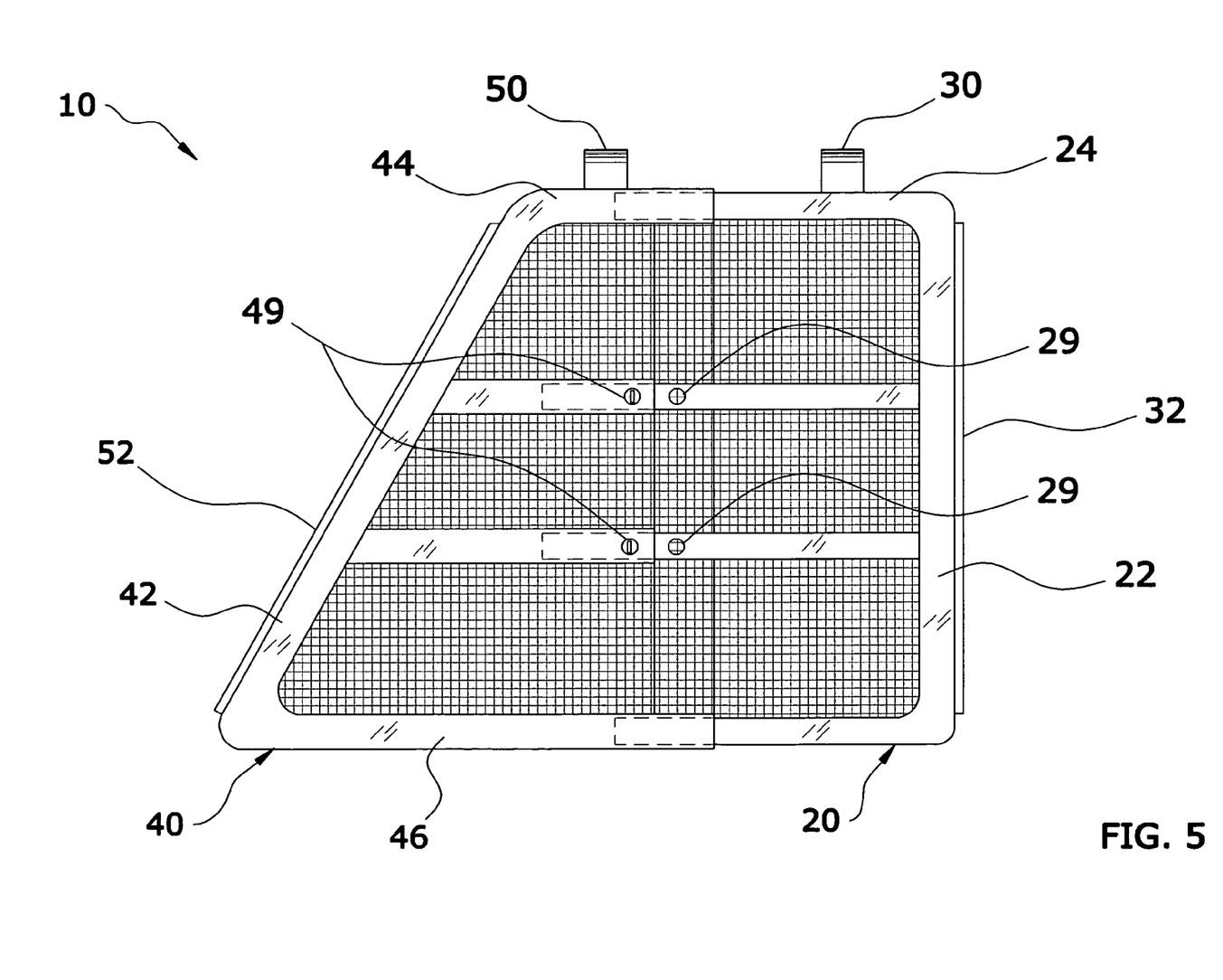
FIG. 5 is an inner side view of the present invention in the expanded position.
Figure 6:
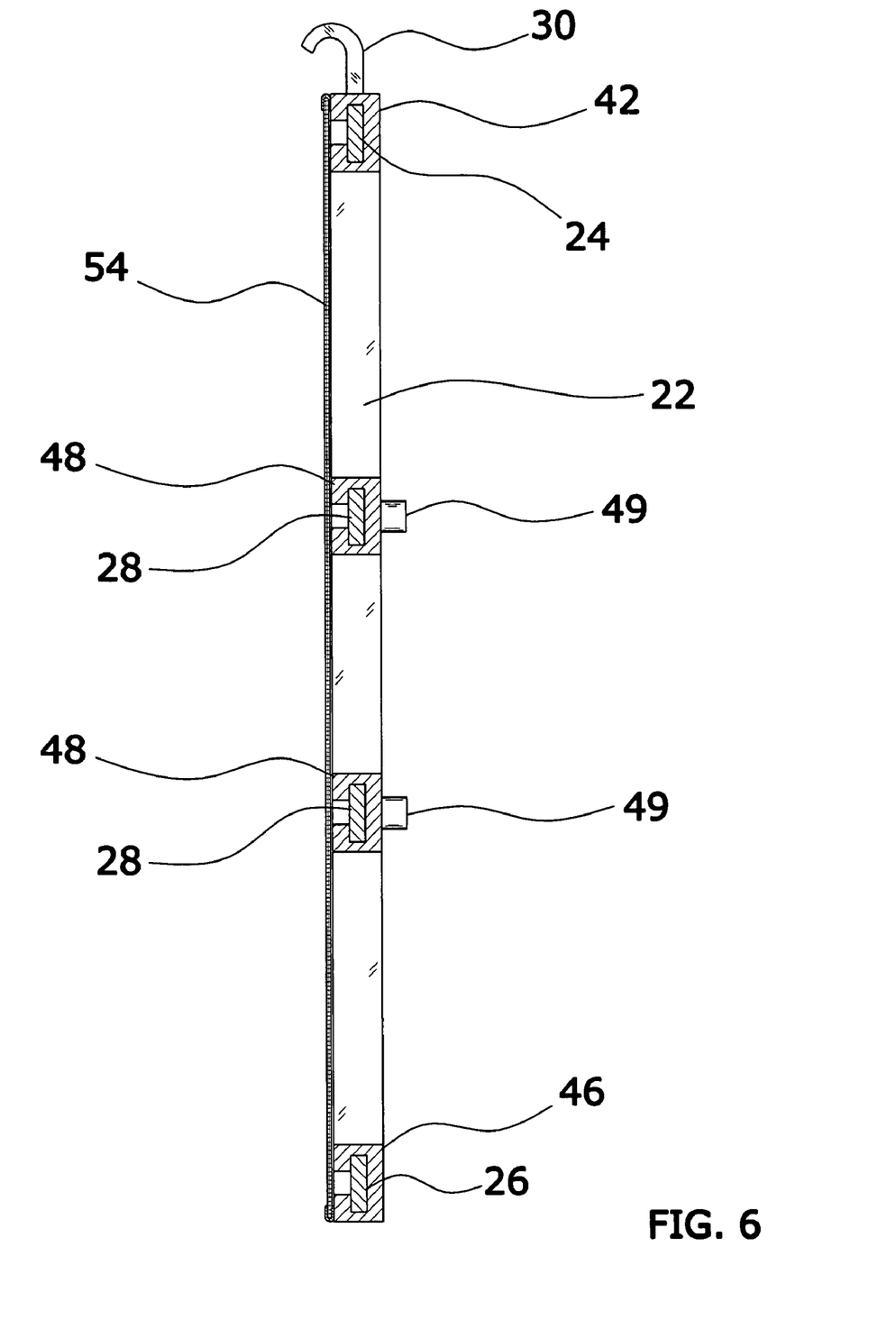
FIG. 6 is a cross sectional view taken along line 6-6 of FIG. 4.
Figure 7:
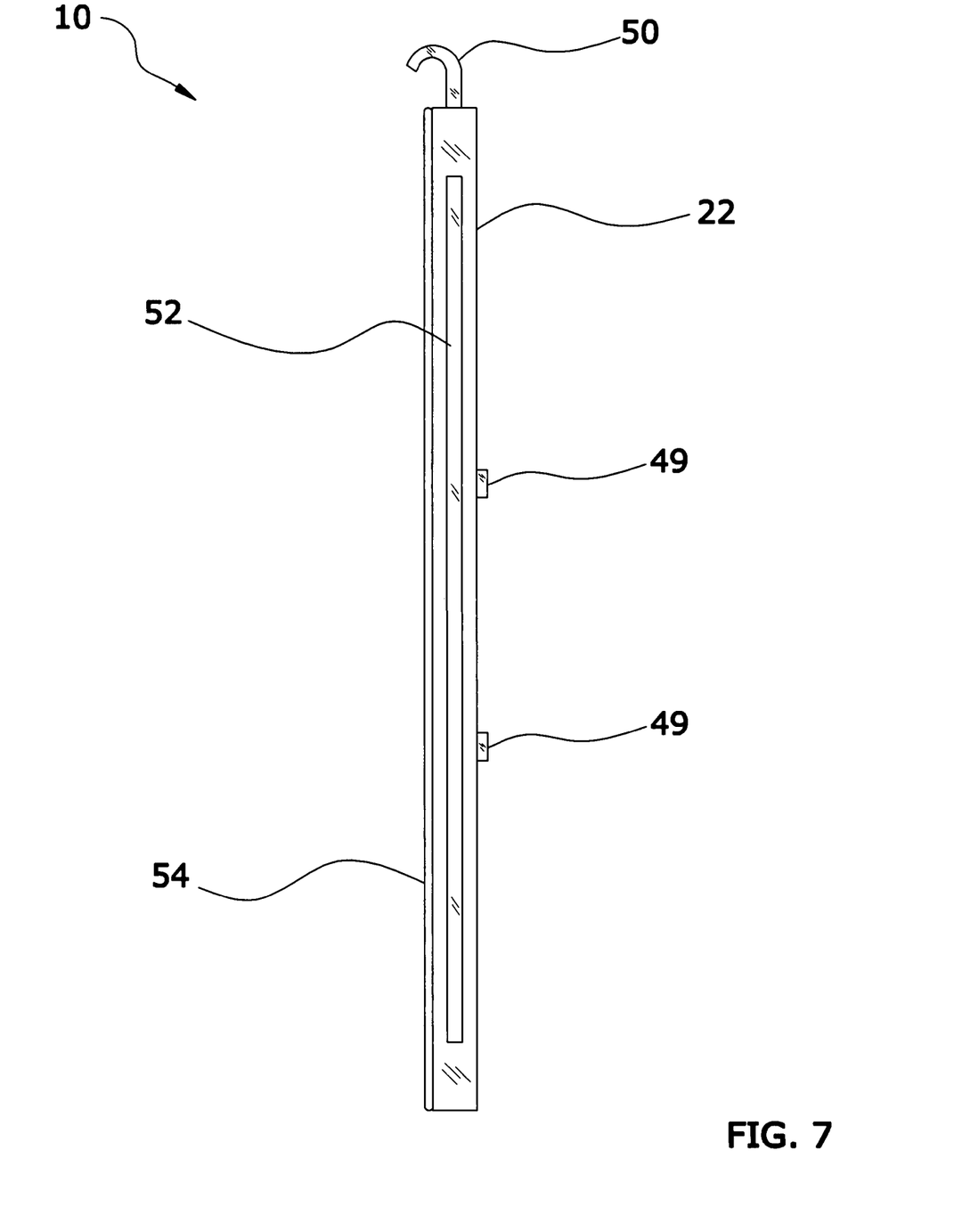
FIG. 7 is an end view of the present invention.
Figure 8:
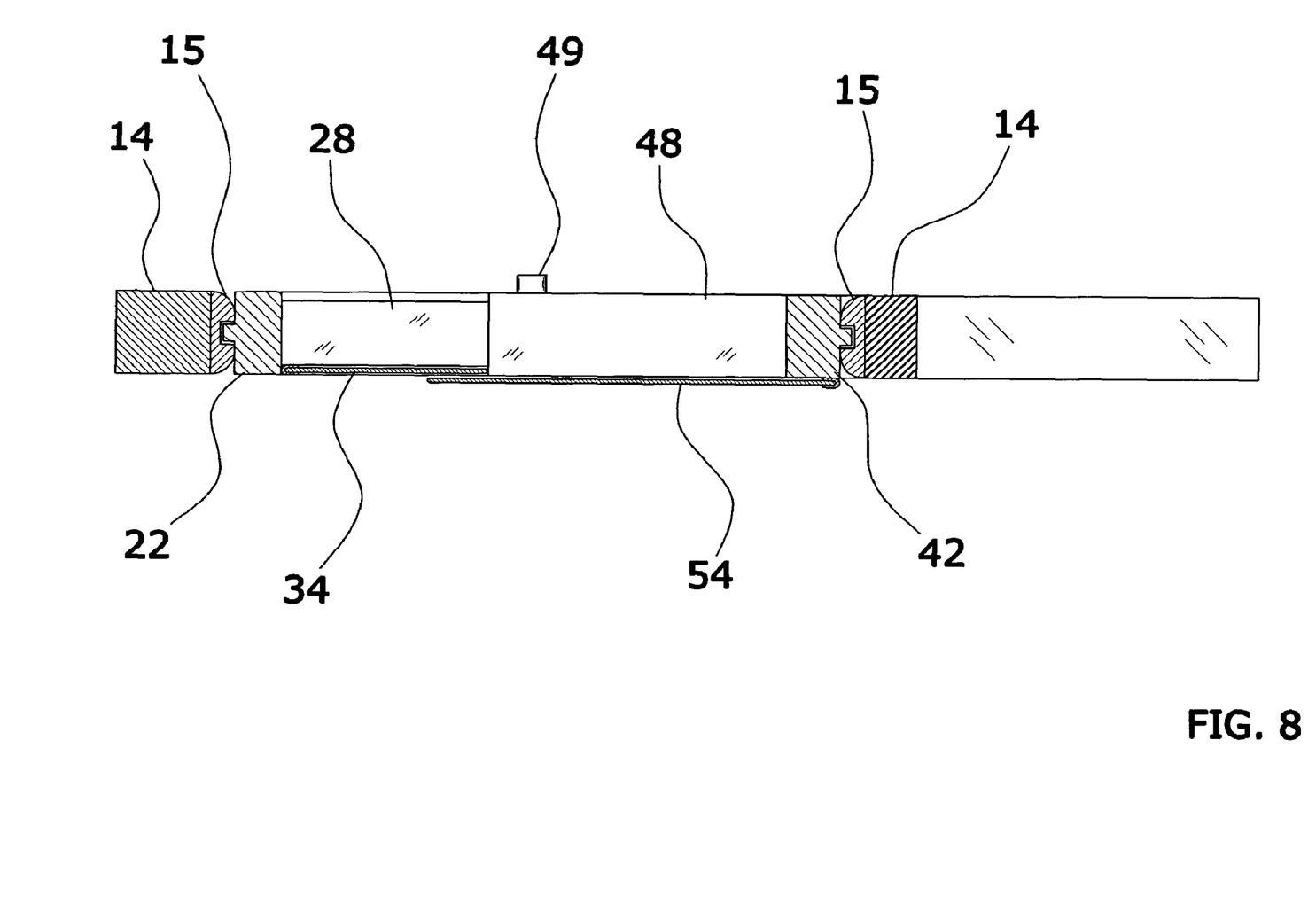
FIG. 8 is a cross sectional view taken along line 8-8 of FIG. 1.

The first extended members 28 preferably have a length greater than the first upper member 24 and the first lower member 26 as best illustrated in FIGS. 4 and 5 of the drawings. The first extended members 28 are preferably comprised of a flat structure that is received within a correspondingly shaped receiver channel 47 within the second extended members 48.

At least one aperture 29 extends within each first extended member as illustrated in FIG. 3 of the drawings. It is preferable to have a pair of apertures 29 in each first extended member to provide for a retracted position and an extended position of the frames with respect to one another.

Figure 1:
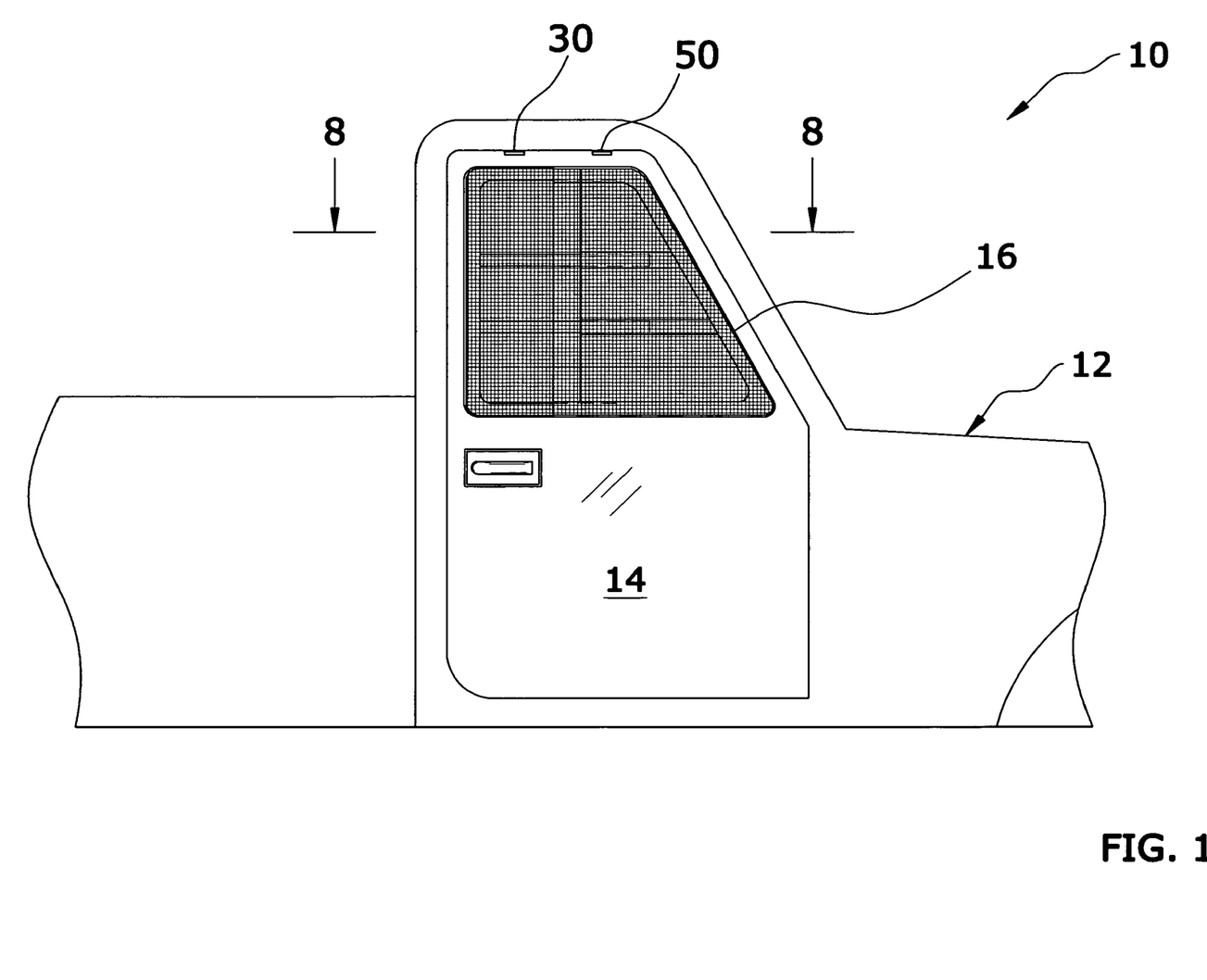
FIG. 1 is a side view of the present invention secured within a window opening of a door.
Figure 2:
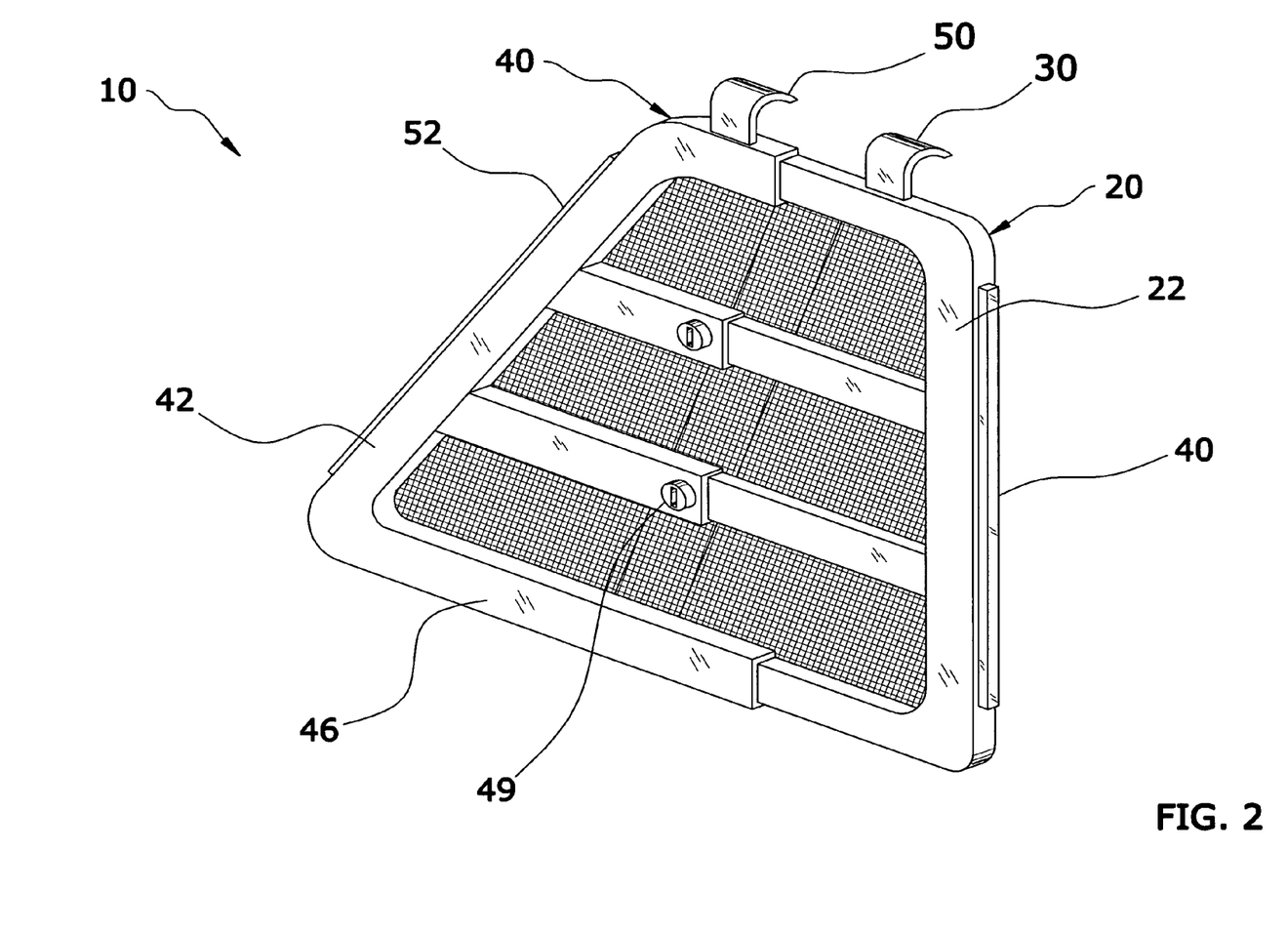
FIG. 2 is a rear upper perspective view of the present invention.

A first hook 30 is attached to an upper end of the first frame 20 to engage an upper portion of a door 14 of a vehicle 12 as shown in FIGS. 2 through 5 of the drawings. FIG. 1 illustrates the first hook 30 extending over the upper portion of the door 14 with the door 14 closed within a vehicle 12. The first hook 30 prevents the first frame 20 from being removed from the door 14 of the vehicle 12 when in use for security reasons.

A first screen 34 is preferably attached to the first frame 20 to prevent entry into the interior of the vehicle 12. The screen is attached to the outer perimeter of the first frame 20 comprised of the first member 22, the first upper member 24 and the first lower member 26. The first screen 34 preferably overlaps the second screen 54 of the second frame 40 a sufficient distance (e.g. 6 inches) to prevent unauthorized access between the screens 34, 54. The first screen 34 is preferably comprised of a wire mesh which is capable of withstanding significant forces while allowing airflow into the vehicle 12.

C. Second Frame

FIG. 3 best illustrates the second frame 40. The second frame 40 includes at least one second extended member 48 which slidably connects with a first extended member from the first frame 20 for adjusting the position of the first frame 20 and the second frame 40 with respect to one another. It is preferable have at least two second extended members 48 for increased security as illustrated in FIG. 3 of the drawings.

The second frame 40 is preferably comprised of a second member 42 extending in an inclined manner from front to back as shown in FIG. 3 of the drawings. The second extended members 48 extend substantially horizontally from the second member 42 as best illustrated in FIG. 5 of the drawings.

The second frame 40 further preferably includes a second upper member 44 extending horizontally from an upper end of the second member 42 and a second lower member 46 extending horizontally from a lower end of the second member 42. The second extended member 48 is preferably substantially parallel with respect to the second upper member 44 and the second lower member 46 as further shown in FIG. 5 of the drawings.

The second frame 40 preferably includes a second rib 52 extending along a portion of the second member 42 to fit within a window channel 15 of a door 14 of a vehicle 12 as illustrated in FIGS. 2 through 5 and 8 of the drawings. The second rib 52 has a width sufficient to a snug fit within the channel of the window channel 15.

The second extended members 48 preferably have a length greater than the second upper member 44 and the second lower member 46 as best illustrated in FIGS. 4 and 5 of the drawings. The second extended members 48 are preferably comprised of a tubular structure slidably receive the first extended members 28. The second extended members 48 each preferably include a receiver channel 47 that slidably receives the corresponding first extended member from the first frame 20 in a slidable manner.

A second hook 50 is attached to an upper end of the second frame 40 to engage an upper portion of a door 14 of a vehicle 12 as shown in FIGS. 2 through 5 of the drawings. FIG. 1 illustrates the second hook 50 extending over the upper portion of the door 14 with the door 14 closed within a vehicle 12. The second hook 50 prevents the second frame 40 from being removed from the door 14 of the vehicle 12 when in use for security reasons.

A second screen 54 is preferably attached to the second frame 40 to prevent entry into the interior of the vehicle 12. The screen is attached to the outer perimeter of the second frame 40 comprised of the second member 42, the second upper member 44 and the second lower member 46. The second screen 54 preferably overlaps the first screen 34 of the first frame 20 a sufficient distance (e.g. 6 inches) to prevent unauthorized access between the screens 34, 54. The second screen 54 is preferably comprised of a wire mesh which is capable of withstanding significant forces while allowing airflow into the vehicle 12.

As shown in FIGS. 2 through 5 of the drawings, at least one lock 49 is attached to the second extended members 48 to selectively engage the apertures 29 within the first extended members 28. The locks 49 selectively extends into the at least one aperture 29 to secure or release the first frame 20 with respect to the second frame 40. The locks 49 may be comprised of any conventional lock structure that extends and retracts a member into or from the apertures 29 within the first extended members 28 to secure the first frame 20 to the second frame 40 in a non-movable manner. A key is preferably used with the locks 49 to cause rotation of the locks 49 to release or lock the same.

D. Operation

In use, the user opens the door 14 of the vehicle 12 and lowers the window thereby exposing the window opening 16 within the door 14. The first frame 20 and the second frame 40 are initially in the retracted position which has a compact structure compared to the expanded position. The user positions the frames 20, 40 within the window opening 16 of the door 14 with the hooks 30, 50 positioned upon the upper portion of the door 14 and then slides the frames 20, 40 outwardly from one another until the ribs 32, 52 are properly positioned within the window channels 15 of the door 14. The locks are then locked to secure the first frame 20 with respect to the second frame 40 in a non-movable position. The user then closes the door 14 and ensures that the vehicle 12 is locked. The screens 34, 54 allow air to pass through the vehicle 12 thereby preventing the temperature from exceeding a dangerous level.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

We claim:

1. A window security screen and barrier removably connected to a vehicle door frame of a vehicle within a window opening of the vehicle door frame, said window opening having a top, a first side, a second side, and a bottom, said window security barrier and screen comprising:

a first frame having a first interior side and a first exterior side, said first interior side being opposite said first exterior side, said first interior side facing an interior of said vehicle, said first exterior side facing an ambient zone external to said vehicle, said first frame having first peripheral members comprising a first upper member, a first side member, and a first lower member, said first peripheral members forming a substantial U-shape structure, said first frame having a plurality of first extended members extending from said first side member and vertically spaced in a substantially equidistant manner between and parallel to said first upper member and said first lower member of said first peripheral members, said first extended members each having a plurality of spaced-apart apertures formed in a distal end of said plurality of extended members, said distal end being opposite said first side member of said first peripheral members;

at least one first curved first hook extending upwardly from said first upper member of said first frame, said at least one first curved first hook curves toward said first exterior side of said first frame from said first interior side, said at least one first curved hook is adapted to hook said vehicle door frame along said top of said window opening;

a first elongated rib protruding from said first side member, said first elongated rib being adapted to interlock with said vehicle door frame along said first side of said window opening;

a first screen comprised of a wire mesh, said first screen attached parallel to or external to said first exterior side of said first frame with respect to said vehicle and said first interior side and said first exterior side of said first frame, said first screen having a length less than said first peripheral members and said first extended members so that said first peripheral members and said first extended members extend beyond said first screen;

a second frame having a second interior side and a second exterior side, said second interior side being opposite said second exterior side, said second interior side facing an interior of said vehicle, said second exterior side facing an ambient zone external to said vehicle, said second frame having second peripheral members comprising a second upper member, a second side member, and a second lower member, said second peripheral members forming a substantial U-shape structure, and said second frame being oriented opposite said first frame, said second frame having a plurality of second extended members extending from said second side member and vertically spaced in a substantially equidistant manner between and parallel to said second upper member and said second lower member of said second peripheral members, said second extended members each having a keyed-lock for extending within one of said plurality of apertures in each of said first extended members to lock said first frame in a spaced-apart position relative said second frame, each of said second peripheral members and said second extended members being substantially hollow to form a cross-sectional C-shaped channel therein for telescopically receiving said first peripheral members and said first extended members;

at least one second curved second hook extending upwardly from said second upper member of said second frame, said at least one second curved second hook curves toward said second exterior side of said second frame from said second interior side, said at least one second curved hook is adapted to hook said vehicle door frame along said top of said window opening, said at least one second curved hook being aligned with said at least one first curved hook to prohibit overlapping of said first hook and said second hook;

a second elongated rib protruding from said second side member, said second elongated rib being adapted to interlock with said vehicle door frame along said second side of said window opening;

a second screen comprised of a wire mesh, said second screen attached parallel to or external to said second exterior side of said second frame with respect to said vehicle and said second interior side and said second exterior side of said second frame, said second screen having a length greater than said second peripheral members and said second extended members to extend beyond said second peripheral members and said second extended members of said second frame, and said second screen adapted to substantially overlap said first screen.

2. The window security screen and barrier of claim 1, wherein said at least one first curved hook being substantially shorter in width than said first top member is in length and wherein said at least one second curved hook being substantially shorter in width than said second top member is in length.

3. The window security screen and barrier of claim 1, wherein said plurality of first extended members have a greater length than said first top member and said first bottom member and wherein said plurality of second extended members have a lesser length than said second top member and said second bottom member.

\* \* \* \* \*